United States Patent [19]

Menke

[11] Patent Number: 5,033,807
[45] Date of Patent: Jul. 23, 1991

[54] TRIPLE MIRROR WHEEL AND METHOD OF MAKING

[76] Inventor: Joseph F. Menke, Foerdestr. 27, D-2392 Gluecksburg, Fed. Rep. of Germany

[21] Appl. No.: 622,280

[22] Filed: Dec. 6, 1990

Related U.S. Application Data

[63] Continuation of Ser. No. 402,461, Sep. 5, 1989, abandoned.

[51] Int. Cl.⁵ .................. G02B 26/08; G02B 27/00
[52] U.S. Cl. ................................ 350/6.7; 350/6.9; 350/320
[58] Field of Search ............ 350/320, 321, 102, 104, 350/107–109, 273, 616, 6.1–6.91; 358/206; 250/568, 201, 203 R, 234–236, 334, 342, 347

[56] References Cited

U.S. PATENT DOCUMENTS

| | | | |
|---|---|---|---|
| 1,743,834 | 1/1930 | Stimson | 350/102 |
| 3,758,715 | 9/1973 | Suck et al. | 350/6.91 |
| 3,802,759 | 4/1974 | Andersson | 350/102 |
| 4,127,771 | 11/1978 | Sick | 350/6.6 |
| 4,266,847 | 5/1981 | Menke | 350/6.6 |
| 4,413,878 | 11/1983 | Lettington | 350/6.7 |
| 4,458,982 | 7/1984 | Blain et al. | 350/6.7 |
| 4,544,228 | 10/1985 | Rando | 350/6.4 |
| 4,602,854 | 7/1986 | Baker | 350/616 |
| 4,733,072 | 3/1988 | Lettington | 350/6.8 |
| 4,747,647 | 5/1988 | Dezoeten et al. | 350/6.8 |
| 4,795,224 | 1/1989 | Goto | 350/6.3 |
| 4,938,551 | 7/1990 | Matsumoto | 350/6.7 |
| 4,958,077 | 9/1990 | Menke | 250/347 |

FOREIGN PATENT DOCUMENTS 141417 6/1984 Japan .................. 350/6.8

*Primary Examiner*—Bruce Y. Arnold
*Assistant Examiner*—Thong Nguyen
*Attorney, Agent, or Firm*—Longacre & White

[57] ABSTRACT

The invention concerns a triple mirror wheel. The construction steps consist in first making the individual parts of a triple mirror wheel, namely a core with ridges rotated by 180° and each time adjacent to one mirror facet. Then two polygon rings are made, which as polygonal surfaces always evince the third facet of the triple mirrors. The core is moved concentrically between two polygon rings and the three parts are rigidly joined so that a triple mirror wheel with adjacent triple mirrors rotated by 180° and with exceedingly sharp edges is formed in the individual triple mirrors.

2 Claims, 3 Drawing Sheets

TRIPLE MIRROR WHEEL AND METHOD OF MAKING

This is a continuation of application Ser. No. 07/402,461, filed Sept. 5, 1989, which was abandoned upon the filing hereof.

CROSS-REFERENCE TO RELATED APPLICATIONS

Applicant claims priority under 35 USC 119 for application P 38 30 926.2 filed Sept. 12, 1988 in West Germany.

The disclosure of applicant's copending application Ser. No. 07/238,734 filed Aug. 31, 1988 and entitled "Method and Apparatus for Displaying Moving Objects" is now U.S. Pat. No. 4,958,077, incorporated herein to show the utility of the triple mirror wheel of the present invention.

BACKGROUND OF THE INVENTION

The invention concerns a triple mirror wheel, that is an optical mechanical component in which triple mirrors are mounted in alternatingly 180° offset manner on a wheel circumference. Such a component is disclosed in West German Patent application P 37 08 883.1 published Sept. 29, 1988.

The manufacture of such mirror wheels is difficult. The wheel is optically suitable only when the three surfaces of the individual triple mirrors intersect with absolute sharpness. When the surfaces do not, and when therefore the three edges of intersections evince roundings, then as the light beams transit from one surface to the adjacent one, beam failure (e.g. scattering of the light beam) takes place which is the more pronounced the larger the radius of curvature of the edges.

SUMMARY OF THE INVENTION

Having in mind the limitations of the prior art it is an object of the present invention to provide a triple mirror wheel where the individual triple mirrors evince sharp edges.

A triple mirror wheel for which several triple mirrors are directly adjoining to one another on one wheel circumference and alternatingly at 180° to each other is prepared by:

(a) making a core (2) of a triple-mirror wheel comprising a hub (1) with ridges offset by 180° formed by two particular adjacent sides (3), (b) first and second polygon rings (4) are made, which are identical and dimensionally match the core (2) and each has polygonal surfaces (5) comprising a third side of each individual triple mirror; and (c) mounting the core (2) concentrically between the first and second polygon rings (4) and joining all components (2; 4) rigidly to each other so that a triple mirror wheel is formed.

BRIEF DESCRIPTION OF THE DRAWINGS

The present invention is illustrated by the embodiment shown in the drawings, wherein.

DESCRIPTION OF THE PREFERRED EMBODIMENTS

Figure 1:
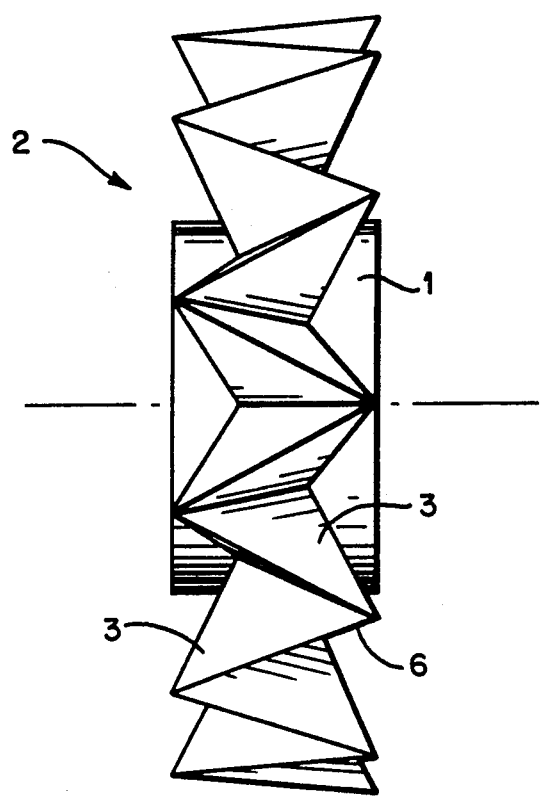
FIG. 1 is a sideview elevation of the triple mirror wheel.

FIG. 1 shows the hub 1 of the core 2 of the triple mirror wheel. In this manner one obtains ridges offset by 180° which are always adjacent on one side 3. That is, as seen in FIG. 1, the series of radially outermost edges formed on the hub by the intersections of the sides 3 defines an annular zig-zag pattern. The annular zig-zag pattern defines a series of circumferentially adjacent V-shaped "crests" or ridges. Adjacent pairs of these V-shaped ridges are each defined by a first V-shaped ridge which faces (or opens) in a first direction and a second V-shaped ridge which faces (or opens) in a second direction opposite to the first direction. The edges between these sides 3, that is the ridges 6, can be made extremely sharp because this geometry permits clear access from all sides to a suitable tool, for instance a milling cutter.

Figure 2:
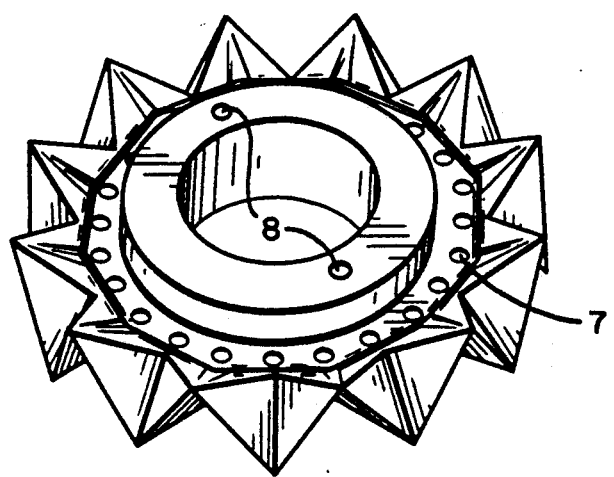
FIG. 2 is a perspective view of the triple mirror wheel of FIG. 1.

Thread holes 7 are shown in FIG. 2 whereby the polygonal rings are secured to the top and bottom of the triple mirror wheel. Bolt holes 8 in the hub 1 are available for connection to means for rotating the triple mirror wheel.

Figure 3:
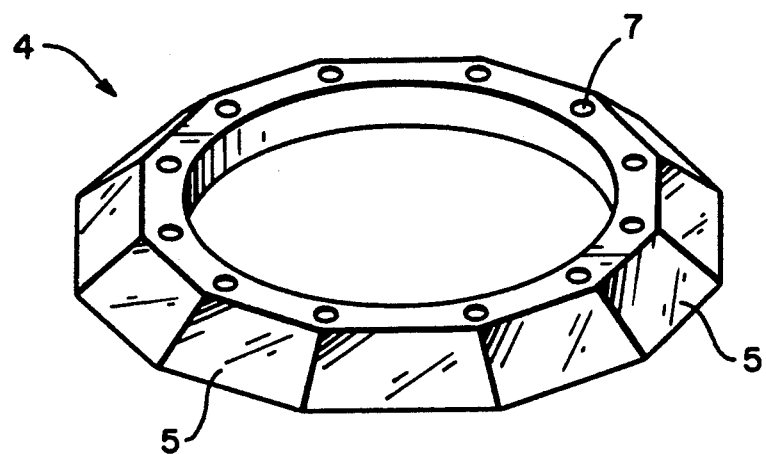
FIG. 3 is a perspective view of the inside surface of a polygonal ring cooperating with the triple mirror wheel.
Figure 4:
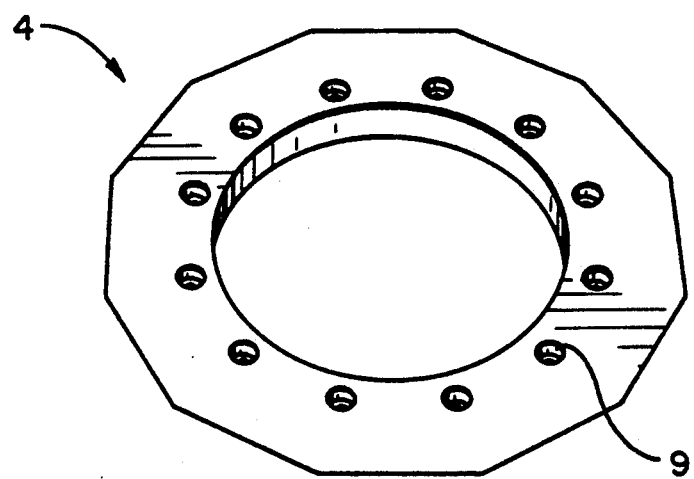
FIG. 4 is a perspective view of the outside surface of the polygonal ring of FIG. 3.

FIG. 3 shows the inside of a polygon ring 4 with smooth polygonal facets 5 of which the dimensions coincide with the missing third sides on the core 2 of FIG. 1 of the triple mirrors to be made individually. Again these polygon surfaces can be made plane with extreme accuracy. Bolt holes 9 facilitate securing the polygon rings onto both sides of the core 2 with bolts or screws.

Figure 5:
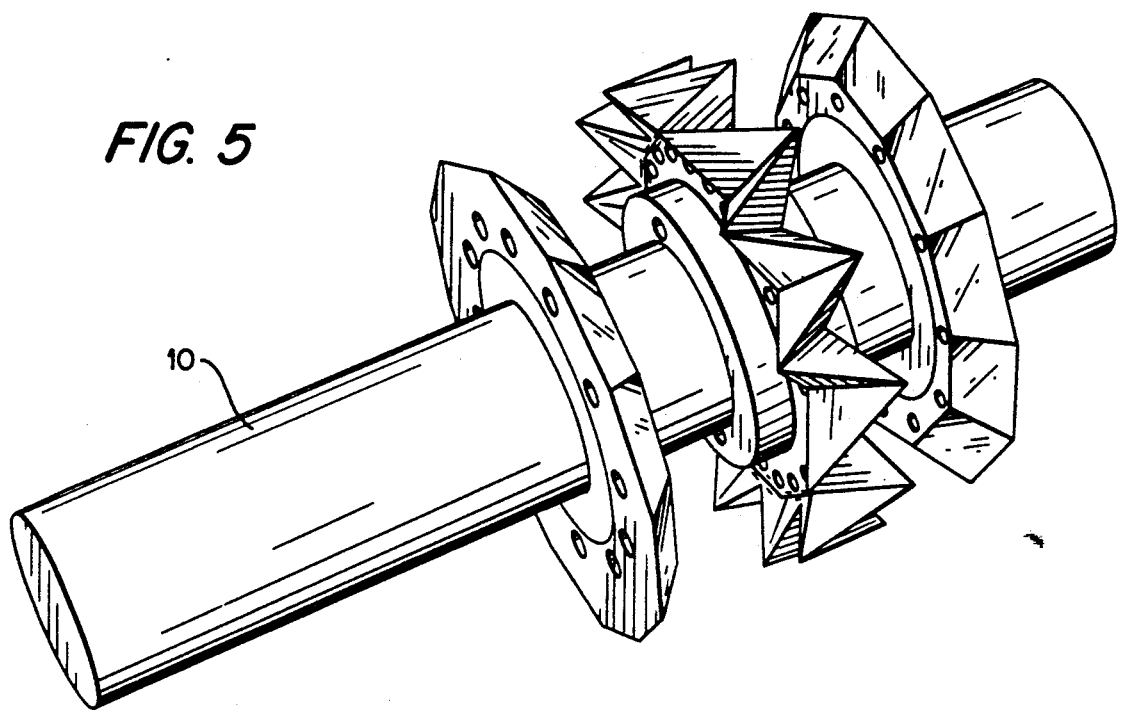
FIG. 5 is a perspective view showing the body of the triple mirror wheel and two polygonal rings on a shaft in their half assembled state.
Figure 6:
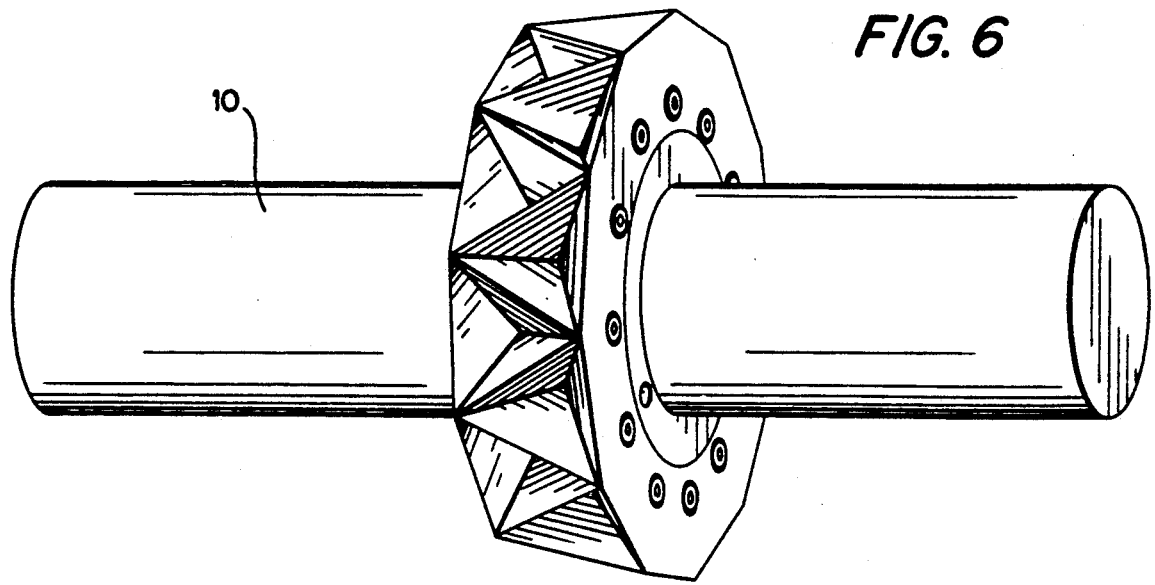
FIG. 6 is a perspective view showing the triple mirror wheel in the fully assembled state on a shaft.

FIG. 5 shows the described three individual components slipped onto a shaft 10 and in the partly assembled state. The core 2 is mounted between two polygon rings 4. FIG. 6 shows these three components fully assembled, that is the two polygon rings 4 are rigidly joined to, i.e., screwed on the core 2.

It is noted that this method permits the production of a triple mirror wheel comprising triple mirrors each time offset by 180° and with exceedingly sharp edges. One edge of each triple mirror, designated above as the ridge, can be made sharp, as already mentioned above, because of the clear access allowed to a tool, on core 2, whereas the two other edges of each triple mirror are formed by the surfaces of the polygon ring on which the external edges of the core 2 lie flat and without any curvature.

I claim:

1. A triple mirror wheel, comprising:
   a first polygonal ring having a plurality of adjacent mirror surfaces on a first side thereof, said reflective surfaces being positioned about an axis;
   a core secured to said first side of said first polygonal ring along said axis, said core comprising a plurality of adjacent ridges, said adjacent ridges being offset 180° one to the other, alternate ridges aligning with said plurality of adjacent mirror surfaces of said first polygonal ring to form a first corresponding number of triplet mirrors;

a second polygonal ring having a plurality of adjacent reflective surfaces on a first side thereof, said second polygonal ring secured along said axis to a side of said core opposite said first polygonal ring, adjacent mirror surfaces of said second polygonal ring aligning with other alternate ridges of said core, and forming a second corresponding number of triplet mirrors.

2. A method of forming a triple mirror wheel having a plurality of adjacent triplet mirrors positioned about an axis, the method comprising the steps of:

positioning a first polygonal ring along the axis, said polygonal ring having a plurality of adjacent mirror surfaces positioned about the axis;

placing a core of the triple mirror wheel along the axis and adjacent to the first polygonal ring, said core comprising a plurality of reflective sides and an annular series of V-shaped ridges which are formed by intersections between the reflective sides, wherein circumferentially adjacent ones of the V-shaped ridges are oriented to face in opposite axial directions of the triple mirror wheel, wherein circumferentially alternate ones of the V-shaped ridges which face toward the first polygonal ring are caused to align with the plurality of adjacent mirror surfaces of the first polygonal ring as the core is placed adjacent to the first polygonal ring, thereby forming a corresponding first number of triplet mirrors;

securing the first polygonal ring to the core;

positioning a second polygonal ring along the axis and adjacent to a side of the core opposite to the first polygonal ring, the second ring comprising a plurality of adjacent mirror surfaces positioned about the axis, the adjacent mirror surfaces of the second polygonal ring aligning with circumferentially alternate ones of the V-shaped ridges which face toward the second polygonal mirror; and, securing the second polygonal ring to the core.

* * * * *